United States Patent
Soulier et al.

(10) Patent No.: US 11,696,075 B2
(45) Date of Patent: *Jul. 4, 2023

(54) OPTIMIZED AUDIO FORWARDING

(71) Applicant: Google LLC, Mountain View, CA (US)

(72) Inventors: Antoine Soulier, Carrieres sur Seine (FR); Thomas Girardier, Bourg la Reine (FR)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,857

(22) Filed: Oct. 19, 2021

(65) Prior Publication Data

US 2022/0038818 A1 Feb. 3, 2022

Related U.S. Application Data

(63) Continuation of application No. 17/148,165, filed on Jan. 13, 2021, now Pat. No. 11,159,885.

(Continued)

(51) Int. Cl.
*H04R 3/12* (2006.01)
*H04W 4/80* (2018.01)
*G10L 19/032* (2013.01)
*G10L 19/008* (2013.01)
*H04R 5/02* (2006.01)

(Continued)

(52) U.S. Cl.
CPC .............. *H04R 3/12* (2013.01); *G10L 19/008* (2013.01); *G10L 19/032* (2013.01); *G10L 19/167* (2013.01); *H04R 5/02* (2013.01); *H04R 5/04* (2013.01); *H04S 1/007* (2013.01); *H04W 4/80* (2018.02); *H04R 2420/07* (2013.01)

(58) Field of Classification Search
CPC ... G10L 19/008; G10L 19/167; G10L 19/032; H04S 3/008; H04S 7/304; H04R 5/033; H04R 2420/07
USPC ........................... 381/22, 315, 307, 309, 310
See application file for complete search history.

(56) References Cited

U.S. PATENT DOCUMENTS 7,548,727 B2 * 6/2009 Desai ...................... H04B 14/04
455/418
10,827,333 B1 * 11/2020 Murali ................ H04W 12/069
(Continued)

OTHER PUBLICATIONS

Brandenburg, "MP3 and AAC Explained", 17th International Conference: High-Quality Audio Coding, Sep. 1999, Sep. 1, 1999, 12 pages.

(Continued)

*Primary Examiner* — Alexander Krzystan
(74) *Attorney, Agent, or Firm* — Kilpatrick Townsend & Stockton LLP

(57) ABSTRACT

Methods and systems for optimizing a routing of audio data to audio transmitting devices using a Bluetooth network are disclosed. One method includes receiving an encoded audio bitstream at a first speaker of the audio rendering system comprising a first and a second audio channels, separating a first set of spectral components of the first audio channel and a second set of spectral components of the second audio channel from the encoded audio bitstream, without decoding the audio bitstream, generating a first encoded bitstream from the first set of spectral components, and forwarding the first encoded bitstream to a second speaker of the audio rendering system over the wireless link.

19 Claims, 10 Drawing Sheets

Related U.S. Application Data

(60) Provisional application No. 62/992,308, filed on Mar. 20, 2020.

(51) Int. Cl.
*H04R 5/04* (2006.01)
*H04S 1/00* (2006.01)
*G10L 19/16* (2013.01)

(56) References Cited

U.S. PATENT DOCUMENTS

| | | | |
|---|---|---|---|
| 10,966,047 B1* | 3/2021 | Tong | H04R 5/033 |
| 2006/0270347 A1* | 11/2006 | Ibrahim | H04M 1/6091 |
| | | | 455/41.2 |
| 2011/0311063 A1* | 12/2011 | De Bont | G11B 20/00086 |
| | | | 381/23 |
| 2017/0134845 A1* | 5/2017 | Milam | H04R 1/1058 |
| 2019/0174557 A1* | 6/2019 | Ueda | H04R 3/12 |
| 2020/0396680 A1* | 12/2020 | Murali | H04W 4/80 |
| 2020/0396681 A1* | 12/2020 | Murali | H04L 9/0825 |

OTHER PUBLICATIONS

Hoene et al., Considering Bluetooth's Subband Codec (SBC) for Wideband Speech and Audio on the Internet, Interactive Communication Systems, Wilhelm-Schickard-Institut, Universitat Tubingen, Sand 13 D-72076 Tubingen, Germany,http://www.net.uni-tuebingen.de/, Oct. 29, 47 pages.

* cited by examiner

OPTIMIZED AUDIO FORWARDING

CROSS REFERENCE TO RELATED APPLICATIONS

This application is a continuation of U.S. patent application Ser. No. 17/148,165, filed Jan. 13, 2021, which claims the benefit of U.S. provisional patent application No. 62/992,308, filed Mar. 20, 2020, which is incorporated by reference herein for all purposes.

BACKGROUND

Methods and devices relying on Bluetooth technology are well-known in the background art. Bluetooth defines a wireless communication standard for sending data using short-wavelength radio waves between different devices. Specifically, Bluetooth enables data exchange over short distances, which can range up to a few tens of meters.

It is known in the background art how to connect a multimedia device, like a computer, a smartphone or a touchpad, to a wireless or wired device to play a given multimedia content. Examples include speakers for playing music at home, hands free units for carrying out a conversation by a smartphone, etc. Bluetooth devices are very popular among customers due to their portability, and in particular, for short-range use like in a home or in a vehicle.

Version 4.0 of Bluetooth, which was released in 2010, comprises Classic Bluetooth, Bluetooth high speed and Bluetooth Low Energy (BLE) protocols. BLE protocols, which are aimed at very low power applications, provide considerably reduced power consumption and cost while maintaining a similar communication range, thus lengthening the battery life of Bluetooth devices.

Moreover, version 5.1 of Bluetooth, which was released in 2019, provides improved positioning capabilities that allow Bluetooth devices determining direction and location of a given device up to centimeter accuracy.

Among hands free unit devices, one of them named "true wireless earbuds" has become one of the trendiest products in the audio industry. True Wireless Earbuds may refer to audio speakers which have neither cords or wires between them (e.g., between two audio speaker devices playing the same audio signal), nor to an audio source (e.g., smartphone).

True wireless earbuds may use the Bluetooth protocol and the Advanced Audio Distribution Profile (A2DP) to connect to an audio source (smartphones, computers, etc.) and different approaches have been developed to allow both earpieces to get the audio data from the same data source. Indeed, the Advanced Audio Distribution Profile only allows to connect one device (e.g., audio source as smartphone) to another device (e.g., audio speaker as earbud).

For this purpose, one of the first designed architectures is called Bluetooth forwarding. In this architecture, one earpiece receives a stereo stream from the audio source on a first Bluetooth communication link and then retransmits it to the other earpiece on a second Bluetooth communication link. This approach has also been used for wireless speakers to create sound systems. The audio source sends a stereo stream to the first earbud which forwards either the whole stereo stream (e.g., stereo audio) or only one of the channels (e.g., left or right audio channel) to the second earbud.

Forwarding only the stereo stream may be efficient in terms of microcontroller (MCU) usage because the packet received by the first earpiece may be directly forwarded without any decoding to extract a specific channel. However, the use of radio communication is more important because a stereo stream takes more bandwidth, and thus increases the power consumption. Besides, only one channel from the stereo stream is used to be played at an earpiece, all other channels are dropped, i.e., they are not used after being transferred from one earpiece to another earpiece.

Forwarding only one of the two channels is more efficient in terms of radio usage and thus preferable both in terms of power consumption and stability. However, the current implementations are poorly efficient in MCU usage because the stereo channel is decoded to extract the interesting channel which is then re-encoded (potentially using a different codec from the one used in the first stream, with lower complexity). All these operations represent a cost in terms of MCU usage of the earpiece and thus in terms of power consumption which is usually very limited.

Therefore, there is need to address the inconveniences mentioned above.

SUMMARY

The present disclosure relates to the field of data routing. Specifically, the present disclosure relates to a method and to a system for optimizing a routing of audio data to audio transmitting devices using a Bluetooth network (Bluetooth is a registered trademark of Bluetooth SIG, Inc.).

This present disclosure improves the situations described above.

It is proposed an audio rendering device system, said audio rendering device system may comprise:
a first speaker comprising a first processor; and
a second speaker;
wherein the first speaker may be configured to transmit data to the second speaker over a wireless link; and
wherein the first processor may be configured to:
receive an encoded audio bitstream comprising a first and a second audio channels;
separate a first set of spectral components of the first audio channel and a second set of spectral components of the second audio channel from the encoded audio bitstream, without decoding the audio bitstream;
generate a first encoded bitstream from the first set of spectral components;—forward the first encoded bitstream to the second speaker over the wireless link.

Thus, advantageously, it may be possible to forward one channel of a multichannel audio bitstream without entirely decoding the encoded audio data comprised in the multichannel audio bitstream. The optimized forwarding is based on a partial decoding and may be performed by maintaining data relative to an audio signal in a frequency domain form, i.e., without use of any time domain transformation.

By decoding, it may be understood performing operations on the encoded audio bitstream to retrieve a decoded audio signal.

The decoding may correspond to the performing of the following operations: unpacking the first encoded bitstream, inverse quantization on the output of the unpacking of the first encoded bitstream, and synthesis of the output of the inverse quantization (of the output of the unpacking of the first encoded bitstream).

By separating, it may be understood to retrieve independent sets of spectral components which are no longer related to each other. Each set of spectral components may be processed independently.

By without decoding, it is meant that one or several steps of the decoding process may be performed but not all of them.

The use of MCU is reduced, as well as the use of bandwidth to forward encoded audio data from a first speaker to a second speaker. Advantageously, this reduction may also lead to a reduction of the power consumption of each speaker (or wireless speaker).

By bitstream, it may be understood a bitstream format comprising the coded (or encoded) audio data and additional encoded data (e.g., sampling rate, copyright, data rate, etc.). The encoded audio data in the bitstream may be representative of one or several audio channels (i.e., a multichannel). For instance, the encoded audio data may be relative to a first channel and may be relative to a second channel. An encoded audio bitstream (or packed encoded audio bitstream) may be understood as the output of an encoder and may be an input for a decoder. The decoder may perform an unpacking of the bitstream (i.e., to obtain an unpacked encoded bitstream) in order to retrieve the encoded audio data and the additional encoded data.

By speaker, it may be understood a device able to emit one or several sounds (i.e., analogue audio signal) on the basis of decoded data (e.g., from the received bitstream). Each speaker (i.e., the first speaker and the second speaker) may comprise a respective processor, a respective memory, and a respective communication interface (e.g., to communicate between each other or/and with a third device). The decoded data may be an audio signal (to play at one or a plurality of channels) in PCM format.

The PCM (for Pulse-Code Modulation) format may correspond to a digital representation of a sampled analog audio signal. More precisely, it may be understood as the conventional digital format of digital audio. Usually, the input of an audio encoder may be an audio signal in PCM format, and the output of an audio decoder as well.

A channel or audio channel may be understood as a single audio channel. An audio channel may be understood as audio data related directly to one audio signal coming from or going to a single point (or position). A multichannel is an audio signal defined by several single channels. When the audio multichannel comprises only a left audio channel and a right audio channel, it may be named stereo audio.

A spectral component may be defined as a representation of an audio signal or a part of an audio signal in the frequency domain (i.e., not in the time domain). Usually, an audio signal may comprise one or several spectral components (e.g., set of spectral components). A spectral component may be encoded and quantized (also called spectral coefficient or sub-band sample in this case) or not depending on which steps may have been performed during a decoding process.

The generating of the first encoded bitstream may be understood as the packing of encoded audio data and additional encoded data related to the first spectral component in order to provide a first encoded bitstream or a combination of several steps of the encoding process.

According to one embodiment, the separating of the first and second sets of spectral components may comprise an unpacking of the encoded audio bitstream.

According to one embodiment, the first channel and the second channel may be joint encoded, and the separating of the first and second sets of spectral components may further comprise an inverse quantization of the unpacked audio bitstream.

By joint encoding, it may be understood the joining of several channels of similar information during the encoding in order to obtain higher quality, a smaller size, or both. The decoding of each channel of a joint encoding may need the encoded data of each interlaced channel of the joint encoding. The first interlaced channel of the joint encoding may correspond to a sum between channels (e.g., channel left+channel right in the case of stereo), and the second interlaced channel of joint encoding may correspond to the difference between these channels (e.g., channel left−channel right in the case of stereo).

When the encoded audio bitstream is a joint stereo audio, the first set and the second set of spectral components may be obtained from the unpacking of the encoded audio bitstream, and followed by an inverse quantization carried out on the output of the unpacking. The output of the inverse quantization may correspond to two sets of spectral components (unquantized) of the two interlaced channels which may then be recombined into the first and second sets of spectral components of the two channels.

A quantization may consist of a process in which each amplitude value of a signal, discrete in time (e.g., a PCM signal obtained from the sampling of an analog signal) or in frequency but continuous in amplitude, are assigned by a unique respective value. More precisely, the quantization is performed by replacing each value of a signal continuous in amplitude (e.g., PCM) by a value of the nearest quantization level (e.g., integer value). The output of the quantization is then a signal discrete in time and in amplitude.

The inverse operation is named inverse quantization and allows obtaining a signal discrete in time but continuous in amplitude (e.g., PCM signal).

According to one or several embodiments, the generating of the first encoded bitstream may be further based on a quantization of the first set of spectral components.

According to one or several embodiments, the second speaker further may comprise a second processor configured to:
  buffer, in a memory of the second speaker, a first digital audio signal, obtained from a decoding of the first encoded bitstream forwarded by the first speaker, and wherein the first processor may be further configured to:
  buffer, in a memory of the first speaker, a second digital audio signal, obtained from a synthesis of the second set of spectral components.

Thus, advantageously, the buffering at a respective speaker of a digital audio signal (e.g., in a PCM format) may allow reducing the time spent in critical interruptions. Indeed, for a true wireless earbuds pair, both earpieces may output the audio data according to a synchronized clock signal without being interrupted to achieve a good synchronization accuracy. Thus, storing decoded audio data allows reducing the time spent to output the audio data in the critical interruption.

By first digital audio signal it may be understood a representation of a sound wave as numerical samples in a continuous sequence, the first digital audio signal may be a PCM stream.

By synthesis, it may be understood the operation corresponding to the reconstruction of a wideband signal of an audio channel on the basis of spectral components of this channel. The process of decomposition performed by the filter bank is called analysis (meaning analysis of the signal in terms of its components in each sub-band). The output of the analysis is referred to as a sub-band signal with as many sub-bands as there are filters in the filter bank. The reconstruction process is called synthesis, meaning reconstitution of a complete signal resulting from the filtering process.

A filter bank is an array of filters (e.g., band-pass filters) or a polyphase quadrature filter which may be used to decompose the input audio signal (i.e., in time domain) into multiple spectral components (i.e., in frequency domain), each one carrying a single frequency sub-band of the input audio signal. At the decoder side, the use of a filter bank synthesis may allow to reconstruct a wideband signal from the spectral components. Together with the corresponding filter bank at a decoder side, it forms an analysis/synthesis system.

The output of the filter bank synthesis may be understood as a decoded audio bitstream or digital audio signal (e.g., PCM stream).

By buffering, it may be understood the storing of a part of the audio stream (or bitstream) in a buffer memory during a limited time (e.g., few hundred milliseconds).

According to one embodiment, the first processor may be further configured to:
generate a second encoded bitstream based on the second set of spectral components;
buffer, in a first memory of the first speaker, the second encoded bitstream, and wherein the second speaker further may comprise a second processor configured to:
buffer, in a second memory of the second speaker, the first encoded bitstream.

Thus, advantageously, the respective buffering of each encoded bitstream may allow to reduce the use of memory during the buffering of each encoded bitstream (i.e., the first encoded bitstream and the second encoded bitstream) performed at respective speakers.

In one or several embodiments, the generating of the second encoded bitstream may be further based on a quantization of the second set of spectral components.

In one or several embodiments, the first processor and the second processor may be further configured to:
perform a synchronization between respective outputs of buffering of each speaker.

In one or several embodiments, at least the first and second speakers may be wireless stereo speakers or true wireless earbuds.

In one or several embodiments, the audio rendering system may be a surround system.

By surround system, it may be understood a system defined by a plurality of speakers to emit a multichannel audio signal. Each channel of the multichannel may be emitted at a respective speaker of the plurality of speakers.

Yet another aspect of the disclosure may be related to a method for forwarding an audio bitstream in an audio rendering system, the method may comprise:
receive an encoded audio bitstream at a first speaker of the audio rendering system comprising a first and a second audio channels;
separate a first set of spectral components of the first audio channel and a second set of spectral components of the second audio channel from the encoded audio bitstream, without decoding the audio bitstream;
generate a first encoded bitstream from the first set of spectral components;
forward the first encoded bitstream to a second speaker of the audio rendering system over the wireless link.

In one embodiment, the separating of the first and second sets of spectral components may comprise an unpacking of the encoded audio bitstream.

In another embodiment, the first channel and the second channel may be joint encoded, and the separating of the first and second sets of spectral components may further comprise an inverse quantization of the unpacked audio bitstream.

In one or several embodiments, the generating of the first encoded bitstream may further be based on a quantization of the first set of spectral components.

In one or several embodiments, the method further may comprise:
buffering a first digital audio signal obtained from a decoding of the first encoded bitstream forwarded by the first speaker,
buffering a second digital audio signal obtained from a synthesis of the second set of spectral components.

In one or several embodiments, the method may further comprise:
generate a second encoded bitstream based on the second set of spectral components;
buffering the second encoded bitstream,
buffering the first encoded bitstream.

In one or several embodiments, the generating of the second encoded bitstream may further be based on a quantization of the second set of spectral components.

In one or several embodiments, the method may further comprise:
performing a synchronization between respective outputs of buffering of each speaker.

Yet another aspect of the disclosure relates to a non-transitory computer readable storage medium, having stored thereon a computer program comprising program instructions, the computer program being loadable into a data-processing unit and adapted to cause the data-processing unit to carry out the method when the computer program is run by the data-processing device.

Other features, details and advantages will be shown in the following detailed description and on the figures.

DETAILED DESCRIPTION

Figures and the following detailed description contain, essentially, some exact elements. They can be used to enhance the understanding of the disclosure and, also, to define the disclosure if necessary.

Figure 1:
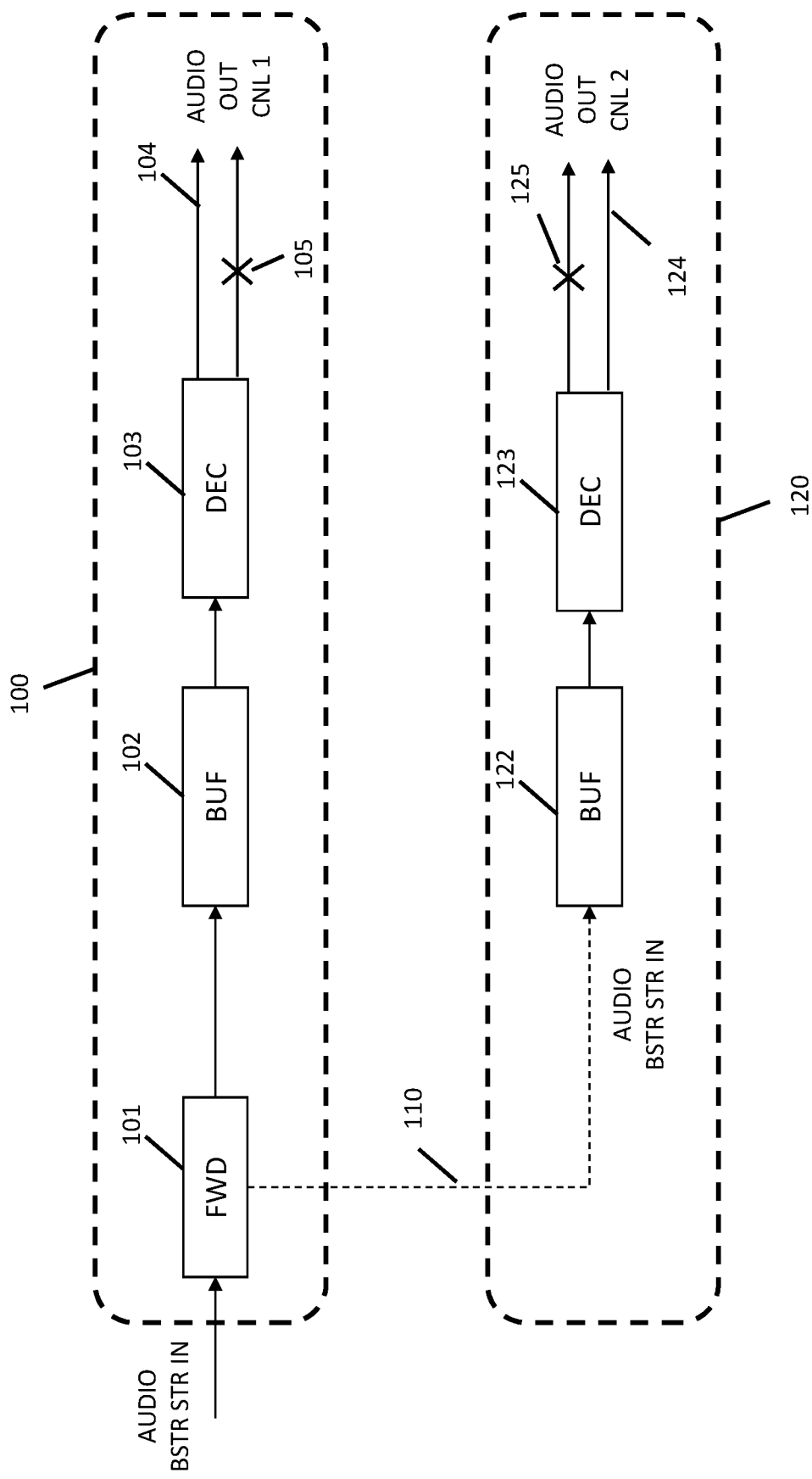
FIG. 1 illustrates a first existing architecture for the forwarding of a stereo bitstream from a first speaker to a second speaker in accordance with the state of the art.

FIG. 1 illustrates a first existing architecture for the forwarding of a stereo bitstream from a first speaker to a second speaker in accordance with the state of the art.

In the first architecture, two audio speakers 100; 120, each comprising radio communication interface, are configured to communicate with each other via a wireless link (e.g., Bluetooth).

An input (e.g., audio stereo bitstream or encoded audio bitstream) is received at the first speaker 100. The encoded audio bitstream may be compressed according to a codec (e.g., SBC, AAC, LDAC), and sent via a wireless link by a third-party device.

The use of a bitstream may allow to transfer data (e.g., audio or video data) by digital communication or storing them in a memory (e.g., in a distance server, or wireless device). The additional data of the bitstream may also comprise information on how the coded audio data may be extracted from the bitstream. For multichannel (e.g., stereo corresponding at two channels), the bitstream may also define (e.g., from the additional data) how the different channels may be laid out relative to each other in encoded audio data. Moreover, the bitstream may generally be segmented as frames for error recovering, reducing decoding latency and buffering size.

The third-party device may be, for instance, a mobile device (e.g., smartphone), a television, a connected speaker, or any third-party device able to send an audio signal via a Bluetooth communication link.

The encoded audio bitstream is forwarded 101 to a memory of the first speaker in order to be buffered 102 and forwarded 101 to a memory of the second speaker 120 via another wireless link 110 in order to be also buffered 122.

The encoded audio bitstream may usually be data defining multichannel audio, and each audio channel may correspond to one audio stream to play by one speaker. The use of multichannel audio may allow to create an illusion of multi-directional audible perspective.

For instance, in the case of stereo audio, two channels may be defined, left and right, which are played on respective speakers (i.e., left and right) in order to reproduce a stereo audio sound for a person. Thus, each audio channel (e.g., CNL 1 for left channel and CNL 2 for right channel) may be played at a respective wireless speaker 100; 120.

The forwarding of the audio input bitstream from the first wireless speaker 100 to the second audio speaker 120 may lead to delay between the playing of each channel at the respective speakers of the audio signal. For instance, the delay may be caused by the quality of the wireless connection, or the working frequency of the processor and the clocks of the different wireless speakers.

The use of a buffer at each speaker may allow to smooth the delay (or latency), and to re-synchronize the two channels in the case of audio stereo for instance. Thus, the memory which performs the buffering may directly depend on the used codecs and its encoding rate. For instance, in the case of SBC codec, the buffering of 200 milliseconds of an audio stereo input bitstream in SBC format with an encoding rate of 325 Kbits/sec needs 65 kilobytes of the memory 102 of the speaker 100. Similarly, after the forwarding of the audio input bitstream 110 to the speaker 120, the audio input stream is buffered 122 in a memory of the second speaker according to the same requirements (i.e., 65 kilobytes for 200 milliseconds buffered).

At each wireless speaker 100; 120, a portion of the buffered input bitstream is transferred to a respective decoder 103; 123 of each wireless speaker. Each decoder may perform the decoding of the audio input bitstream to obtain each audio channel 105; 125; 104; 124 of the audio input bitstream even if one of the channels is not played at the respective speaker. For instance, only the audio channel 104 (e.g., CNL1) may be played at the wireless speaker 100, and the audio channel 105 is dropped (i.e., not played). In a similar way, only the audio channel 124 (e.g., CNL2) may be played at the wireless speaker 120, and the audio channel 125 is dropped (i.e., not played).

This architecture configuration may be considered as optimal for the buffering process since it does not solicit a lot of memory.

Figure 2:
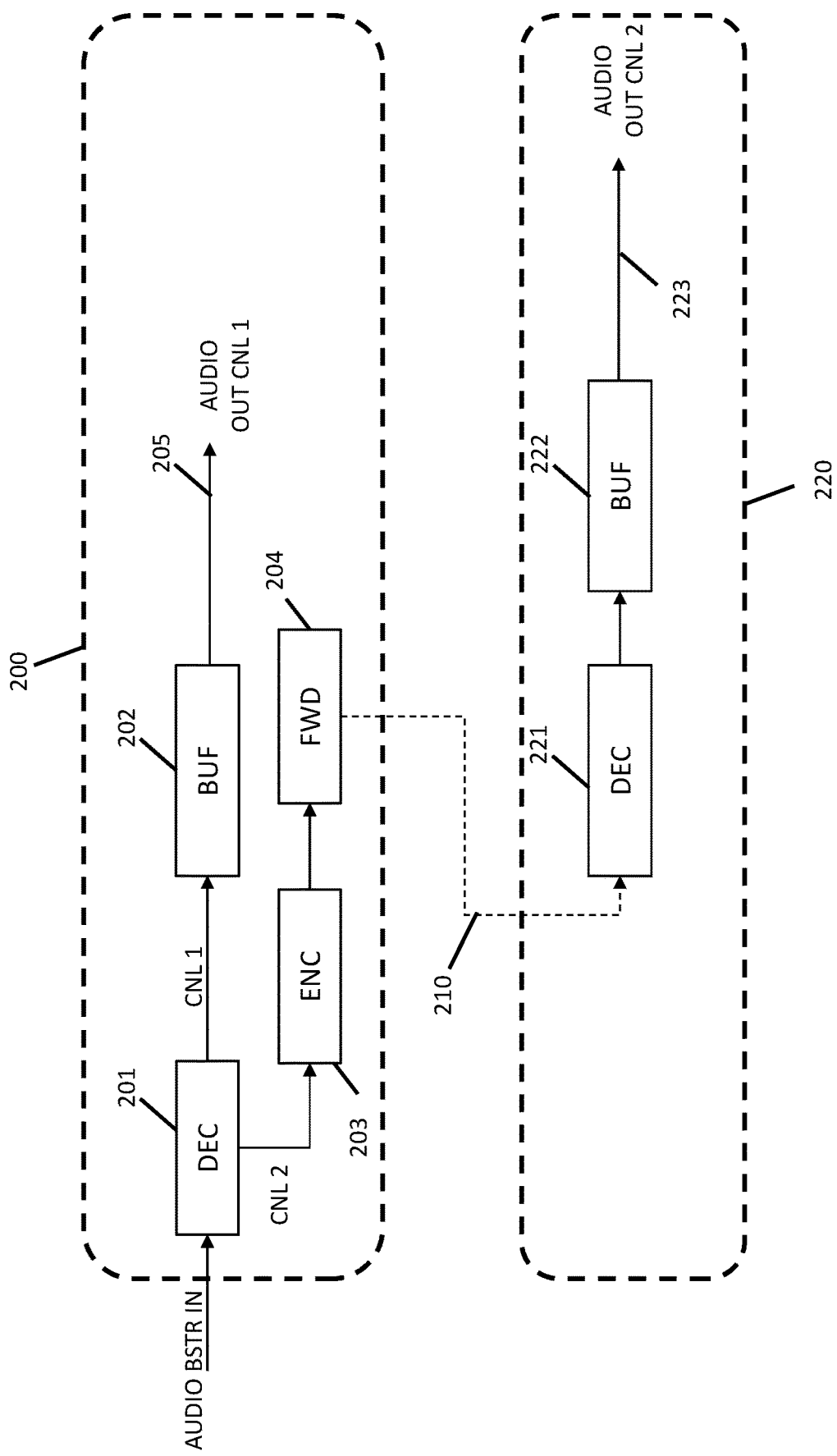
FIG. 2 illustrates a second existing architecture for the forwarding of a stereo bitstream from a first speaker to a second speaker in accordance with the state of the art.

FIG. 2 illustrates a second existing architecture for the forwarding of a stereo bitstream from a first speaker to a second speaker in accordance with the state of the art.

In this forwarding architecture, at the wireless speaker 200, the input (e.g., encoded audio bitstream or audio input bitstream or packed audio bitstream) may be decoded 201 in order to retrieve decoded audio signals corresponding to the respective audio channels (e.g., CNL1 and CNL2) of the encoded audio bitstream. For instance, a first audio signal CNL1 is transferred to a memory of the wireless speaker 200 in order to be buffered 202 before being played 205. Still at the wireless speaker 200, the second audio signal CNL2 may be re-encoded 203 before being forwarded 204 to the wireless speaker 220.

For instance, the second decoded audio channel may be re-encoded 203 with a different codec (e.g., with lower complexity) from the one used for encoding the audio bitstream.

At the wireless speaker 220, the second re-encoded audio channel CNL2 may be decoded 221 after its forwarding 210 by the wireless speaker 200. A buffering 222 of the second audio channel (CNL2) may follow the decoding process before being played 223.

In this second existing architecture, the buffering at each wireless speaker may be performed directly on decoded audio signals corresponding to the respective audio channels (CNL1 and CNL2). Thus, for instance, in the case of SBC codec, the buffering 202 of 200 milliseconds of an audio signal (CNL1) in SBC format with an encoding rate of 325 Kbits/sec needs 141 kilobytes of the memory of the speaker 200. Similarly, after the forwarding of the audio input bitstream 210 to the speaker 220, the second audio signal (CNL2) may be buffered 222 in a memory of the speaker 220 according to the same requirements (i.e., 141 kilobytes for 200 milliseconds buffered).

Forwarding only one of the two channels may be more efficient in terms of radio usage and thus preferable both in terms of radio power consumption and stability. However, current implementations may be poorly efficient in MCU usage because the stereo channel is decoded to extract the interesting channel which is then re-encoded.

Figure 3:
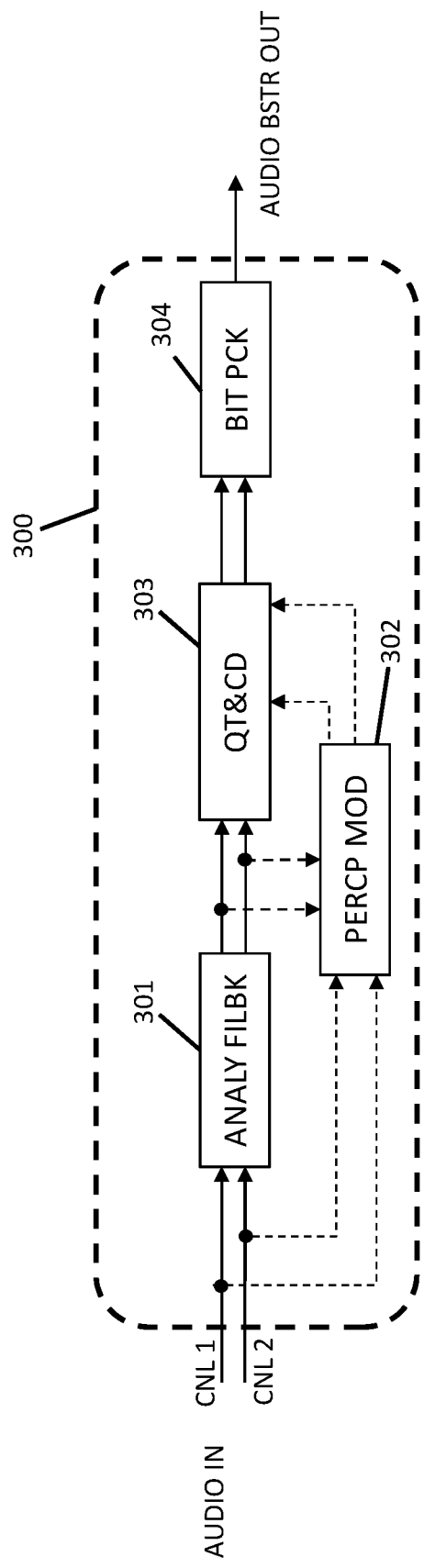
FIG. 3 illustrates the basic block diagram of an encoding system (e.g., used for AAC, MP3 and SBC codecs).

FIG. 3 illustrates the basic block diagram of an encoding system (e.g., used for AAC, MP3 and SBC codecs).

The encoding system 300 may comprise several elements to carry out the encoding process of an input audio signal. For instance, the input audio (or input audio signal) may be in PCM format and may comprise two channels CNL1; CNL2 (i.e., stereo).

In PCM format, the amplitude of the analog audio signal may be sampled regularly at uniform intervals, and each sample may be quantized to the nearest value (e.g., an integer) within a range of digital steps.

The PCM format may be characterized by two properties which may determine the fidelity of the sampled audio signal compared to the original audio signal (i.e., analog audio signal).

The first property may be the sampling rate which may correspond to the number of times per second that samples are taken.

The second property may correspond to the bit depth which may determine the number of possible digital values that may be used to represent each sample. Typically, the PCM format may be in 4, 8 or 16 bits. The PCM format may be considered as a lossless format, but not as a compressed format.

At the reception of a stereo input audio by the encoding system 300, the two channels CNL1; CNL2 may be analyzed by a filter bank 301. Each channel may correspond to a PCM mono audio (e.g., left or right), and the set of channels may correspond to a stereo audio signal in a PCM format.

The sub-band samples may correspond to several frequency bands (or frequency ranges). The sub-band samples may be understood as a set of quantized spectral components representing a part of the input audio signal. For instance, in the case of SBC codec, the number of frequency bands may be 4 or 8.

In parallel with the filter bank analysis, each channel of the input audio signal may be transferred to a perceptual module 302. From the time domain input signal (i.e., CNL1 and CNL2) and/or from the output of the analysis filter bank, an estimate of the actual (time and frequency dependent) masking threshold (i.e., the threshold below which any signal may not be audible) may be computed using rules known from psychoacoustics. This may be called the perceptual model of the perceptual encoding system.

The psychoacoustics may be defined as the scientific study of sound perception and audiology (i.e., how humans may perceive various sounds). More specifically, it may be defined as the branch of science which studies the psychological and physiological responses associated with sound (e.g., noise, speech and music). The psychoacoustics may be used for improving the compression by identifying inaudible sounds in the audio signal which may be removed with a masking threshold before generating a bitstream.

The use of perceptual model in encoding systems may not be mandatory, and some audio encoding systems don't use it, or use it in a very limited way (e.g., SBC encoders/decoders).

The output of the filter bank analysis (e.g., spectral components) with/without the output of the perceptual model may be then quantized and encoded 303, with the aim of keeping the noise, which may be introduced by quantizing, below the masked threshold (e.g., by the use of simple block companding or analysis-by-synthesis systems using additional noiseless compression).

The output of the quantization and coding module 303 may be packed into a bitstream 304 in order to generate at the output of the encoding system an output audio bitstream (i.e., an encoded audio bitstream).

This output encoded audio bitstream may comprise data required for the decoding of both channels (i.e., CNL1 and CNL2).

The bitstream packing may be performed via the bitstream formatter used to assemble the bitstream (i.e., the quantized and encoded spectral coefficients and some side information, as for instance the bit allocation information).

Figure 4A:
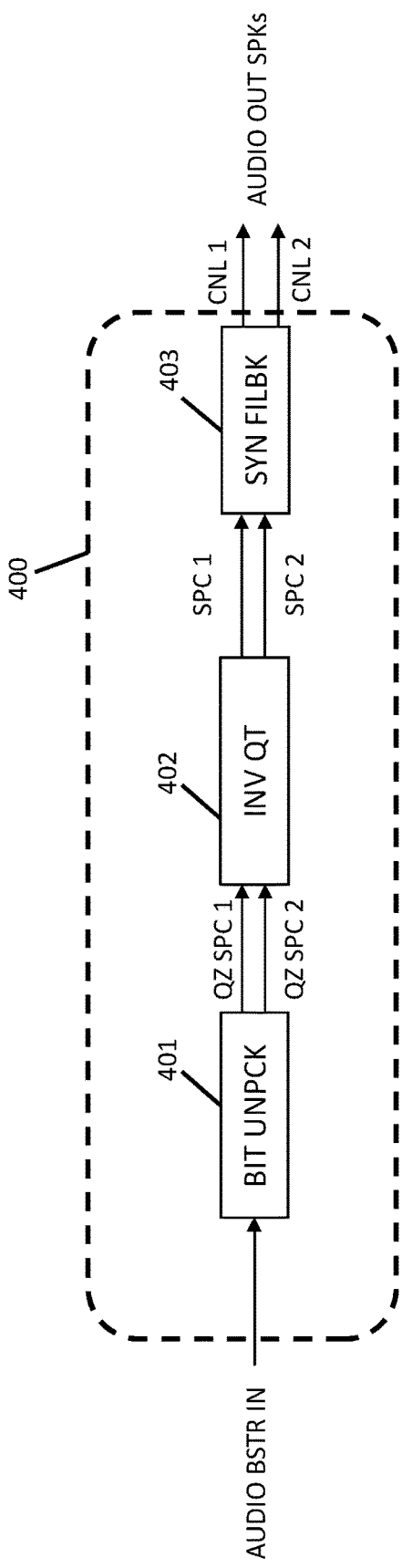
FIG. 4a illustrates the basic block diagram of an SBC decoding system in the case of a stereo input bitstream.

FIG. 4a illustrates the basic block diagram of an SBC decoding system in the case of a stereo input bitstream.

An input (e.g., encoded audio bitstream, audio input bitstream, or packed audio bitstream), for instance generated by the encoding system 300, and transmitted to a decoder 400, may be unpacked 401 before any other operation comprised in a decoding process.

The unpacking of the audio input bitstream allows to extract quantized spectral components comprised in the received audio bitstream. For instance, in the case of an audio bitstream in stereo format, the output of the unpacking 401 may be two sets of quantized spectral components (QZ SPC1 and QZ SPC2). In the case of a normal stereo bitstream (i.e., not joint stereo) as input, a first set of quantized and encoded spectral components may be related to a right channel, and a second set of quantized and encoded spectral components may be related to a left channel.

After the unpacking, an inverse quantization 402 may be performed on the two sets of encoded and quantized spectral components by the decoder 400. The output of the inverse quantization (SPC 1 and SPC 2) may be the sets of spectral components of each respective channel of the original audio signal.

A synthesis filter bank 403 may then be performed on the output of the inverse quantization (i.e., on the sets of spectral components) in order to obtain each decoded audio channel (CNL1 and CNL2).

After the reconstruction 403, the outputs of the synthesis filter bank (or decoded audio bitstream or PCM stream) may be then be played at the respective speakers, for instance CNL2 at the left speaker and CNL1 at the right speaker.

Figure 4B:
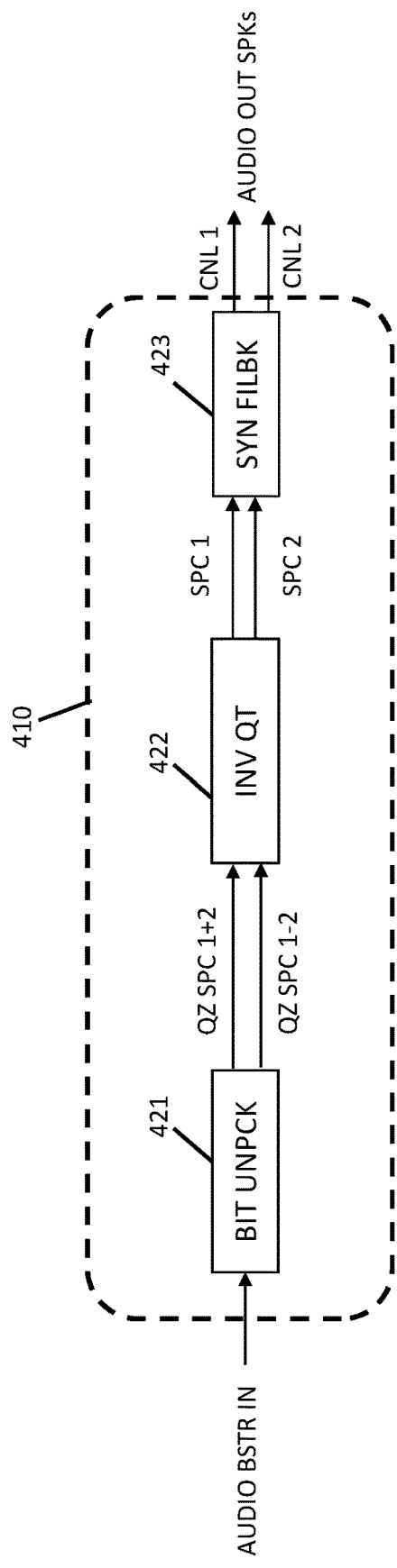
FIG. 4b illustrates the basic block diagram of an SBC decoding system in the case of a joint stereo input bitstream.

FIG. 4b illustrates the basic block diagram of an SBC decoding system 410 in the case of a joint stereo input bitstream.

The process of decoding a joint stereo bitstream (also called matrix stereo) is very similar to the stereo decoding process previously presented. In the case of joint stereo, the right and the left channels are encoded in an interlaced manner in a middle channel and a side channel, and the output of the unpacking 421 may be two sets of quantized spectral components (QZ SPC 1+2 and QZ SPC 1−2) corresponding to the middle and side channels.

The middle quantized spectral components may be the output of the quantization of the sum of spectral components, and the side quantized spectral components may be the output of the quantization of the difference between the same spectral components. For instance, in the case of joint stereo, the middle quantized spectral components may be the output of the quantization of the sum of two sets of spectral components related to a right and a left channel. Likewise, the side quantized spectral components may be the output of the quantization of the difference between the two sets of spectral components related to the right and the left channels.

As for the stereo decoding process, an inverse quantization 422 may be performed on the middle quantized spectral components and the side quantized spectral components (i.e., on the output of the unpacking). The output of the inverse quantization 422 may be the respective spectral components of respective middle and side channels which may then be recombined into the spectral components of each audio channel (e.g., left and right) of the original audio signal. For instance, in the case of joint stereo (i.e., L: left, R: right, M: middle and S: side), the recombination may correspond to the following operations: SPC L=½*(SPC M+SPC S) and SPC R=½*(SPC M−SPC S). The inverse quantization on interlaced middle and side channels may allow to obtain independent set of spectral components (i.e., related to a specific channel as right or left), and not anymore in the form of sum or difference of sets of spectral components.

After the reconstruction 423 by the use of a synthesis filter bank on the spectral components, the audio channels (CNL1 and CNL2) may be then played at the respective speakers, for instance CNL2 at the left speaker and CNL1 at the right speaker.

The use of joint stereo streams (or joint channels) may allow obtaining higher quality, a smaller size, or both of the audio bitstream.

Indeed, in the case of joint channels (i.e., two channels, left and right) the Left/Right channels may be very similar, so most information may be in the middle channel and only a small amount of information may be in the side channel. Thus, the redundant part between both channels (i.e., left and right) doesn't have to be stored twice.

The choice between joint-stereo channels or stereo channels may be done dynamically when streaming depending on the efficiency and may typically be indicated in a bit field in the encoded audio stream.

Figure 5:
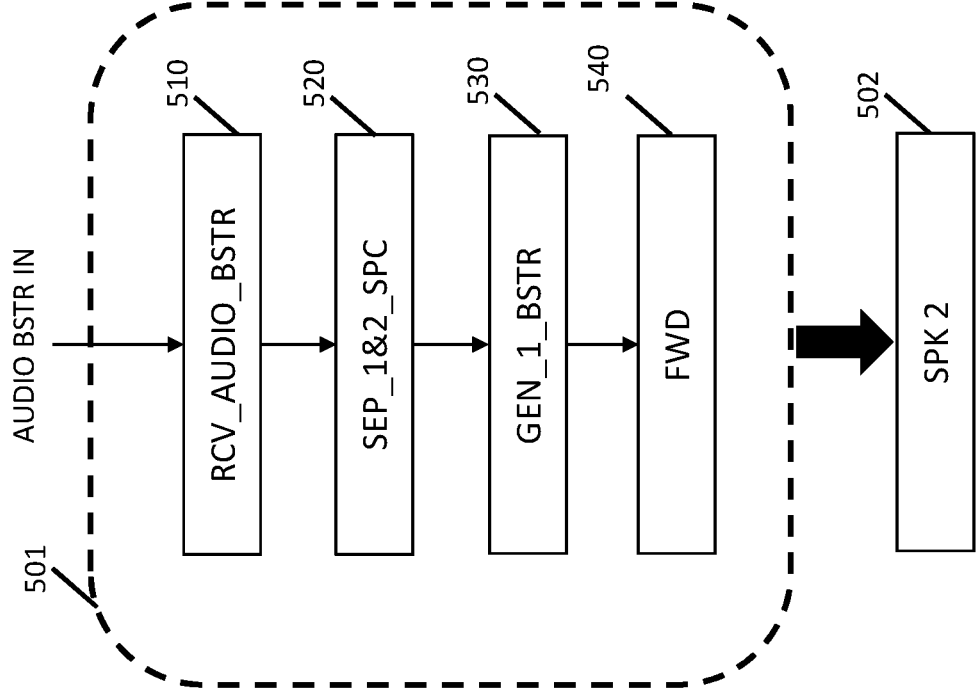
FIG. 5 illustrates a flowchart of an optimized forwarding in accordance with specific embodiments disclosed herein.

FIG. 5 illustrates a flowchart of an optimized forwarding in one or several embodiments of the present disclosure.

An input may be received 510 at a first speaker 501 of an audio speaker system. The audio speaker system may further comprise a second speaker 502.

The input may be an encoded audio bitstream and may be relative to an input audio signal (e.g., in PCM stereo format) passed through an encoding process (e.g., SBC encoder). The encoded audio bitstream may comprise first and second audio channels.

The first speaker may comprise a first processor, and the second speaker may comprise a second processor. Furthermore, the first speaker may transmit data to the second speaker over a wireless link (or wireless network), and vice versa.

Thus, the first processor of the first speaker may be configured to separate a first set of spectral components related to the first channel (e.g., right channel or middle channel) and a second set of spectral components related to the second channel (e.g., left channel or side channel) from the received encoded audio bitstream 520, without decoding the received audio bitstream.

By without decoding, it is meant that one or several steps of the decoding process may be performed but not all of them.

Thus, the separating may allow to process each set of spectral components independently. More precisely, a processing performed on a first set of spectral components may be performed without consequences on the spectral components of a second set of spectral components.

Then, the first processor may generate 530 a first encoded bitstream based on the first set of spectral components.

After the generating of the first encoded bitstream, it may be forwarded 540 by the first speaker to the second speaker 502 by the wireless link.

Thus, each speaker may play their respective channel. The second speaker may play the first channel corresponding to the first set of spectral components, and the first speaker may play the second channel corresponding to the second set of spectral components.

By "play", it may be understood, to emit (i.e., an analog audio signal or sound) via the respective speaker the decoded audio signal related to its respective audio channel obtained from the synthesis of its respective set of spectral components.

Figure 6:
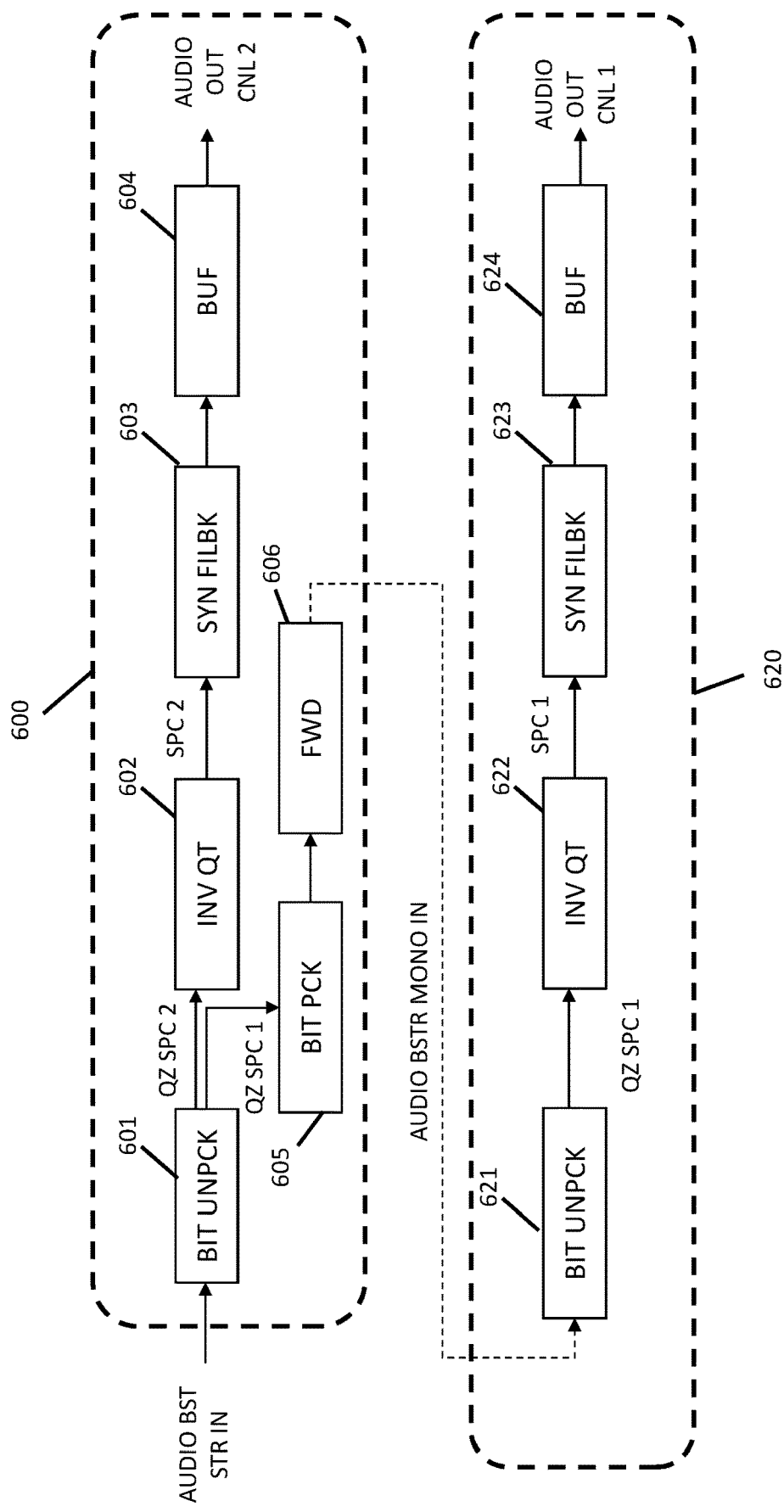
FIG. 6 illustrates the forwarding from a stereo stream with decoded bitstream buffering in accordance with specific embodiments disclosed herein.

FIG. 6 illustrates the forwarding from a stereo stream with decoded bitstream buffering in one or several embodiments of the present disclosure.

An input (e.g., an encoded audio bitstream or a packed audio bitstream) may be received at a first speaker 600 of an audio speaker system (e.g., wireless audio speaker system). For instance, the encoded audio bitstream may be a stereo encoded audio bitstream (AUDIO BST STR IN), which may comprise two audio channels (e.g., left and right). The audio speaker system may further comprise a second speaker 620, and both speakers 600; 620 may communicate by a wireless link.

A first set of spectral components of the first audio channel and a second set of spectral components of the second audio channel may be separated from the encoded audio bitstream, without decoding the audio bitstream (i.e., by performing only one or several operations of a decoding process on the audio bitstream, but not necessarily the full process of decoding). In order to retrieve separately a first set of spectral components relative to the first channel and a second set of spectral components relative to the second channel, the separating (or separating process) may comprise an unpacking of the encoded audio bitstream.

Thus, the encoded audio bitstream (or input) may be unpacked 601 in order to obtain a first set of quantized spectral components related to a first channel and a second set of quantized spectral components related to a second channel (QZ SPC 1, QZ SPC 2). For instance, in the case of normal stereo (i.e., not joint stereo), the first set of quantized and encoded spectral components (or set of encoded and quantized spectral components, or set of quantized spectral components) may be relative to a right channel (or left channel), and the second set of quantized and encoded spectral components may be relative to a left channel (or right channel).

After the unpacking, the second set of quantized spectral components (QZ SPC 2) may go through an inverse quantization process 602 and a synthesis filter bank process 603 before a buffering 604 (e.g., in a memory of the first speaker).

The inverse quantization process (or inverse quantization) may allow obtaining one or several sets of spectral components exploitable for, or to be used by, the synthesis filter bank process 603. For instance, the inverse quantization of the second set of quantized spectral components may allow obtaining a second set of spectral components (SPC 2) i.e., not quantized and encoded. From the second set of spectral components (SPC 2), the synthesis filter bank 603 process may reconstruct the audio signal of the second channel to play (AUDIO OUT CNL2) at the first speaker 600. The reconstructed audio signal may be in a PCM format.

The first set of quantized and encoded spectral components (QZ SPC 1) obtained after the unpacking 601 of the bitstream may be directly repacked 605 into a first encoded bitstream before being forwarded 606 by the first speaker to the second speaker 620 through the wireless link.

More precisely, the first encoded bitstream may be forwarded without any time domain transformation performed before the forwarding.

The first encoded bitstream may correspond to encoded data related to an audio single signal (e.g., channel right) and additional encoded data (for instance bit allocation information or scale factors).

At the second speaker side 620, the forwarded first encoded bitstream may be unpacked 621 by the second speaker. The unpacking may be performed, for instance, by a second processor of the second speaker, and the output of the unpacking may correspond to the first set of quantized spectral components.

As for the second set of quantized spectral components, the first set of quantized spectral components may go through an inverse quantization process 622 performed by the second processor in order to be exploitable or used by a synthesis filter bank process 623.

For instance, the inverse quantization of the first set of quantized spectral components may allow to obtain a first set of spectral components (SPC 1), i.e., not quantized and encoded. From the first set of spectral components, the synthesis filter bank 623 process may reconstruct the audio signal (AUDIO OUT CNL1) to play at the second speaker 620.

The output of the synthesis filter bank 623 (e.g., PCM mono audio right) of the second speaker may be then buffered 624 in order to be synchronized with the output of the synthesis filter bank (e.g., PCM mono audio left) of the first speaker before both of them are played (i.e., the emitting of an analog mono audio signal corresponding to the right side and the emitting of an analog mono audio signal corresponding to the left side).

The buffering may allow synchronization of the output audio signal of the first channel playing at the second speaker 620 with the output audio signal of the second channel playing at the first speaker (600).

The playing of each output of the synthesis filter bank (i.e., each PCM stream) at the respective speaker may be performed by an electroacoustic transducer comprised in each respective speaker, or may be done by any component capable of transforming an electrical signal (e.g., the value of amplitude of each sample of the mono PCM stream) into soundwaves.

Thus, the forwarding of the first channel (relative to the first set of quantized spectral components) does not need to go through a full decoding process followed by a re-encoding process for instance. Indeed, it is directly forwarded after being packed (or encoded) to the second speaker in order to be played. More precisely, the first channel may stay in a frequency form before being forwarded (i.e., without time domain transformation before forwarding).

Figure 7:
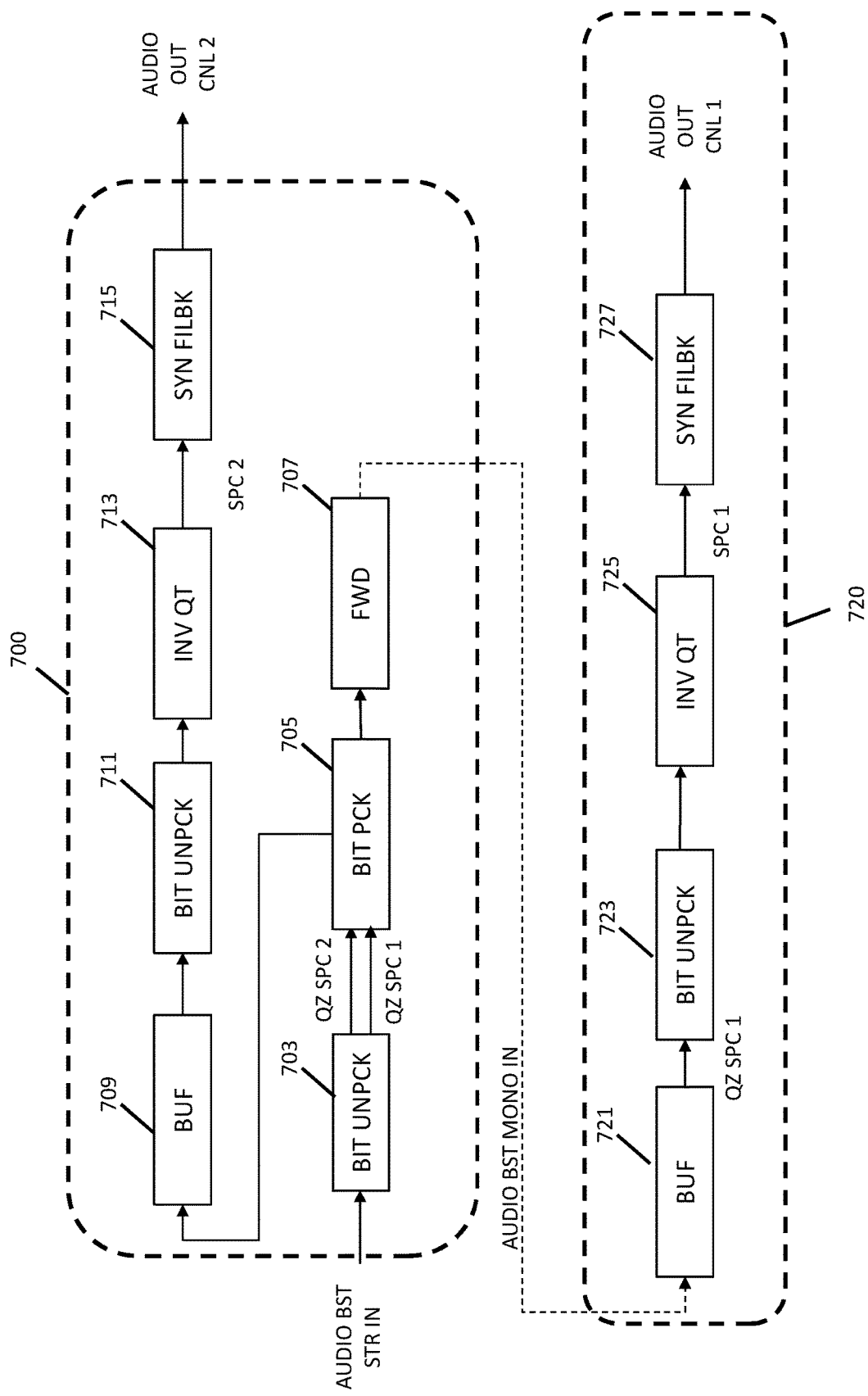
FIG. 7 illustrates the forwarding from a stereo stream with encoded bitstream buffering in accordance with specific embodiments disclosed herein.

FIG. 7 illustrates the forwarding from a stereo stream with bitstream buffering in one or several embodiments of the present disclosure.

The audio speaker system, the features of the input signal as well as the operations performed on the input signal described in FIG. 6 may be transposed to embodiments presented in FIG. 7.

Thus, an input (e.g., an encoded audio bitstream in stereo) may be received at the first speaker 700 of an audio speaker system, and may be unpacked 703 before any forwarding to the second speaker 720 in order to obtain the first set of quantized and encoded spectral components (QZ SPC 1) and the second set of quantized and encoded spectral components (QZ SPC2) as described previously.

After the unpacking, each set of quantized and encoded spectral components may be encoded (or packed or re-packed) 705 separately in a respective bitstream.

Thus, the first set of quantized and encoded spectral components may be encoded (or packed) into a first bitstream, and then buffered 721 in memory of the second speaker 720 after being forwarded 707 by the first speaker via the wireless link. The second set of quantized and encoded spectral components may be encoded (or packed) into a second bitstream before being buffered 709 in a memory of the first speaker 700.

Thus, each set of quantized spectral component may be separately encoded (or packed) into a respective bitstream, and then buffered by the respective memory of each speaker.

The respective buffering 709; 721 of each encoded bitstream (or each packed bitstream) at respective speaker 700; 720 may be carried out before the unpacking of each packed bitstream (i.e., the unpacking of the first encoded bitstream, and the unpacking of the second encoded bitstream).

During the buffering 709; 721 at respective speakers 700; 720, each encoded bitstream (or a respective part of each encoded bitstream) may be decoded according to an unpacking, followed by an inverse quantization of the output of unpacking, and followed by a synthesis filter bank of the output of the inverse quantization.

More precisely, the first encoded bitstream may be unpacked 723, and then an inverse quantization 725 (or inverse quantization process) may be carried out on the output of the unpacking (i.e., on the first set of quantized spectral components) in order to be exploitable or used by the synthesis filter bank 727 (or synthesis filter bank process) of the second speaker 720.

For instance, the inverse quantization 725 of the first set of quantized spectral component may allow obtaining a first set of spectral components (SPC 1), i.e., not quantized and encoded. From the first set of spectral components, the synthesis filter bank 727 process may reconstruct the audio signal to play at the second speaker 720 (AUDIO OUT CNL1).

In a similar way that the first encoded bitstream, the second encoded bitstream may be unpacked 711, and then an inverse quantization 713 (or inverse quantization process) may be carried out on the output of the unpacking (SPC 2), i.e., on the second set of spectral components, in order to be exploitable or used by the synthesis filter bank 715 (or synthesis filter bank process) of the first speaker 700 (AUDIO OUT CNL2).

Each output of respective synthesis filter banks 715; 727 may correspond to a mono PCM stream (e.g., corresponding to a right side or to a left side), and each mono PCM stream may be played at respective speakers 700; 720.

Figure 8:
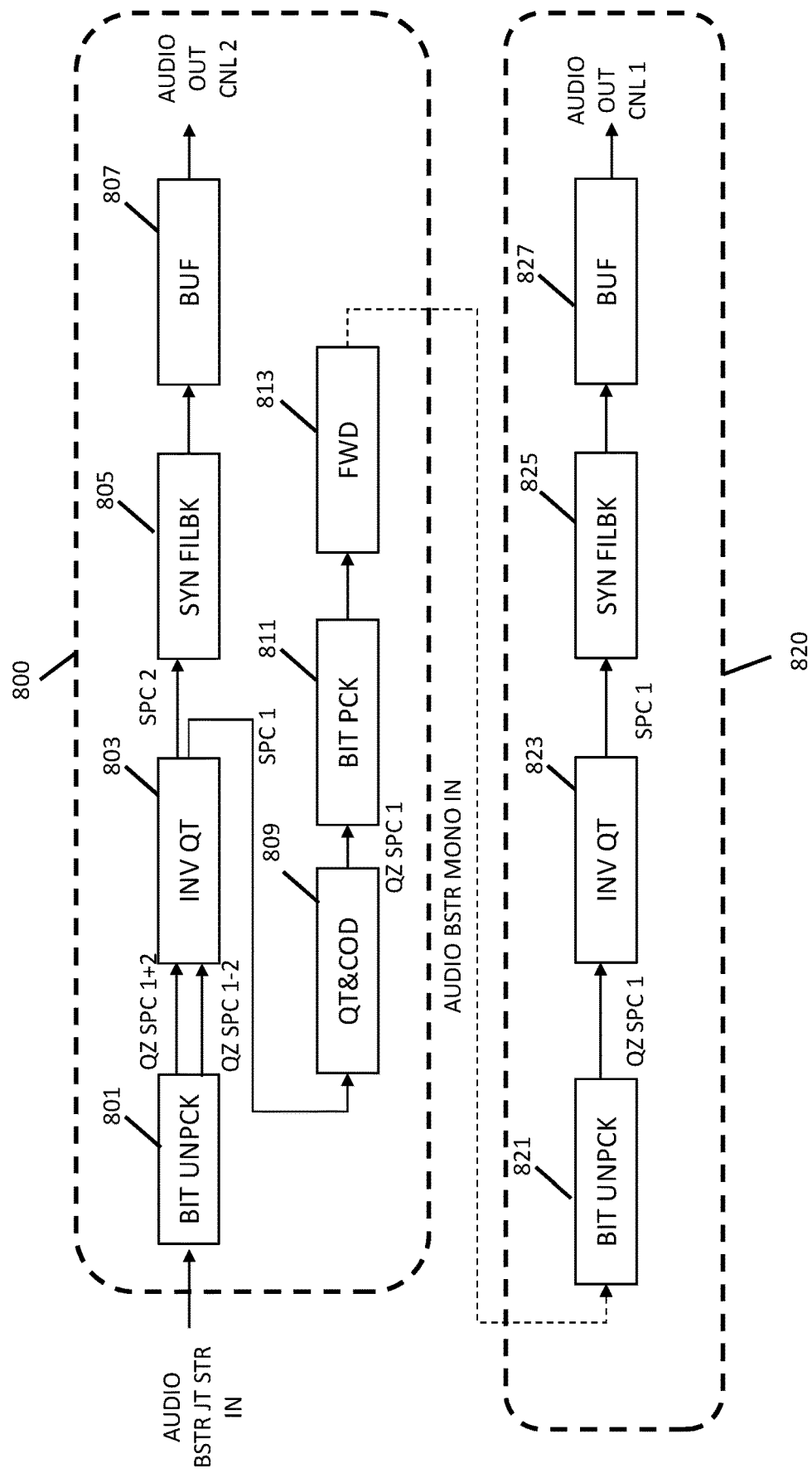
FIG. 8 illustrates the forwarding from a joint stereo stream with decoded bitstream buffering in accordance with specific embodiments disclosed herein.

FIG. 8 illustrates the forwarding from a joint stereo stream with buffering in one or several embodiments of the present disclosure.

The audio speaker system described in FIG. 6 or FIG. 7 may be transposed to embodiments presented in FIG. 8.

An input (e.g., an encoded audio bitstream or audio bitstream relative to a joint stereo format) may be received at the first speaker 800 of an audio speaker system.

A first set of spectral components of the first audio channel and a second set of spectral components of the second audio channel may be separated from the encoded audio bitstream, without decoding the audio bitstream (i.e., by performing only one or several operations of a decoding process on the audio bitstream, but not necessarily the full process of decoding). In the case of joint stereo for instance, the full process of decoding may not be completely performed, and only the operation of unpacking and inverse quantization may be carried out on the audio bitstream.

Thus, the encoded audio bitstream may be unpacked 801 in order to obtain a first set of quantized spectral components related to a first interlaced channel (e.g., mid-channel) and a second set of quantized spectral components related to a second interlaced channel (e.g., side channel) corresponding to a sum and a difference between a right channel and a left channel. More precisely, they may be the outputs of the quantization of the sum and the difference between two sets of spectral components (e.g., relative to a left and right audio channel).

The output of the unpacking (i.e., QZ SPC 1+2 and QZ SPC 1−2) may go through an inverse quantization 803 process. By recombining the outputs of the inverse quantization, it may be possible to determine a first set of spectral components (SPC 1), and a second set of spectral components (SPC 2). Thus, it may be possible to retrieve independent sets of spectral components relative to specific channels (e.g., right and left channels in the case of joint stereo).

Indeed, the inverse quantization process 803 (or inverse quantization) may allow retrieving respective sets of spectral components (i.e., not anymore correlated under a form of sum or difference between sets of spectral components) to play at the respective speakers (i.e., left or right).

After the inverse quantization 803, the second set of spectral components (SPC 2) may go through a synthesis filter bank process 805 followed by a buffering 807 (e.g., in a memory of the first speaker) before being played by the first speaker (AUDIO OUT CNL2).

In parallel, the first set of spectral components (SPC 1) may be quantized and encoded 809 to generate a first set of quantized spectral components (QZ SPC 1) before being packed 811 into a first encoded bitstream and forwarded 813 to the second speaker by the first speaker via the wireless link.

At the second speaker 820, the first encoded bitstream may be decoded in order to be played at the second speaker. By decoding, it is meant that the first encoded bitstream may be unpacked 821, and an inverse quantization 823 (or inverse quantization process) may be carried out on the output of the unpacking (i.e., on the first set of quantized spectral components QZ SPC 1) in order to be exploitable or used (i.e., by obtaining a first set of spectral components not quantized SPC 1) by the synthesis filter bank 825 (i.e., reconstruct the audio signal under a PCM stream for instance) of the second speaker 820 (AUDIO OUT CNL1).

As described for the first speaker, the output of the synthesis filter bank (e.g., PCM mono stream right) of the second speaker may be then be buffered 827 in order to be synchronized with the output of the synthesis filter bank (e.g., PCM mono stream left) of the first speaker, also buffered 807, before both of them are played at the respective speakers 800; 820.

Figure 9:
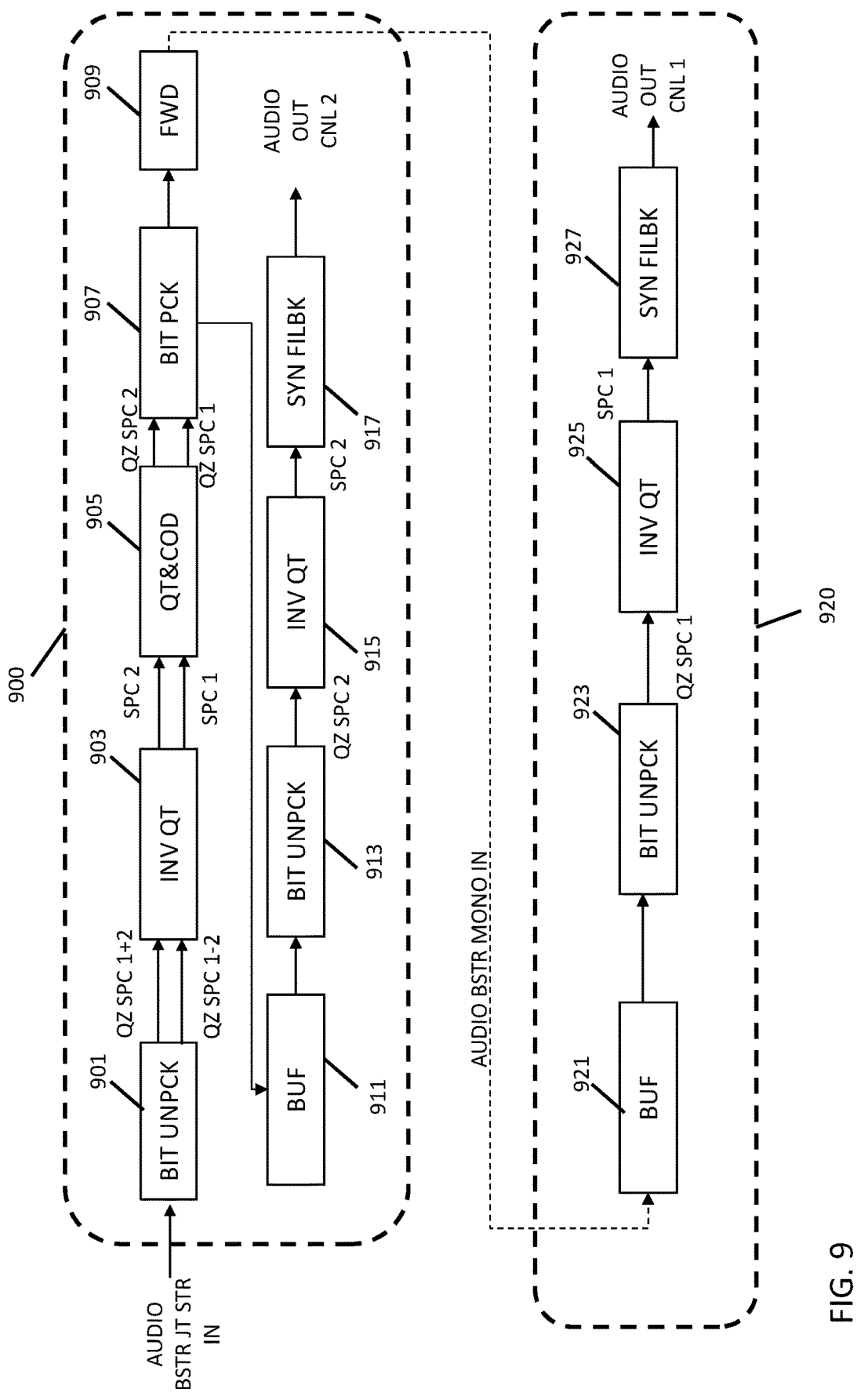
FIG. 9 illustrates the forwarding from a joint stereo stream with encoded bitstream buffering in accordance with specific embodiments disclosed herein.

FIG. 9 illustrates the forwarding from a joint stereo stream with bitstream buffering in one or several embodiments of the present disclosure.

The audio speaker system, the features of the input signal as well as the operations performed on the input signal described in FIG. 8 may be transposed to embodiments presented in FIG. 9.

An input (e.g., encoded audio bitstream) may be received at the first speaker 900 of an audio speaker system.

As described previously in FIG. 8, two sets of quantized spectral components corresponding to the outputs of the quantization of a sum and a difference between two sets of spectral components corresponding respectively to a mid-channel (i.e., a first channel) and side channel (i.e., a second channel) may be obtained by the unpacking of the input.

In the same way (i.e., as described in FIG. 8), the output of the unpacking 901 (i.e., QZ SPC 1+2 and QZ SPC 1−2) may go through to the inverse quantization 903 process in order to obtain a first set of spectral components (SPC 1) and a second set of spectral components (SPC 2), i.e., not anymore correlated under a form of sum or difference between sets of spectral components.

As described in FIG. 8 for the generating of a first set of quantized and encoded spectral components, each set of spectral components (i.e., the first set of spectral components and the second set of spectral components) may be quantized and encoded 905 in order to obtain a first set of quantized and coded spectral components (QZ SPC 1) and a second set of quantized and coded spectral components (QZ SPC 2).

Each set of quantized and encoded spectral components (i.e., QZ SPC 1 and QZ SPC 2) may be encoded (or packed) 907 into a respective encoded bitstream. Thus, the first set of quantized and encoded spectral components may be packed into a first encoded bitstream before being forwarded 909 by the first speaker to the second speaker, and then buffered 921 in a memory of the second speaker 920.

In a similar way, the second set of quantized and encoded spectral components may be packed into a second encoded (or packed) bitstream before being buffered 911 in a memory of the first speaker 900.

Thus, the buffering 911; 921 in respective memory of each set of quantized spectral components may be performed with less memory, and may allow to synchronize the output audio signal of the first channel with the output audio signal of the second channel before both of them are played at respective speakers 900; 920.

During the buffering 911; 921 at respective speakers 900; 920, each encoded bitstream (or a respective part of each encoded bitstream) may be decoded at the respective speaker (in a similar way as the decoding described in FIG. 8 for the forwarded first encoded bitstream) i.e., unpacked 913; 923 followed by an inverse quantization process 915; 925 and then followed by a synthesis filter bank process 917; 927.

Thus, each output of respective synthesis filter bank 917; 927 may be in a PCM mono stream (e.g., corresponding to a right side or to a left side), and each PCM mono stream may be played at respective speakers 900; 920.

Thanks to each buffering, the playing of each PCM mono stream may be synchronized with less memory, and the playing at the same time of both PCM mono streams may correspond to a stereo signal.

Figure 10:
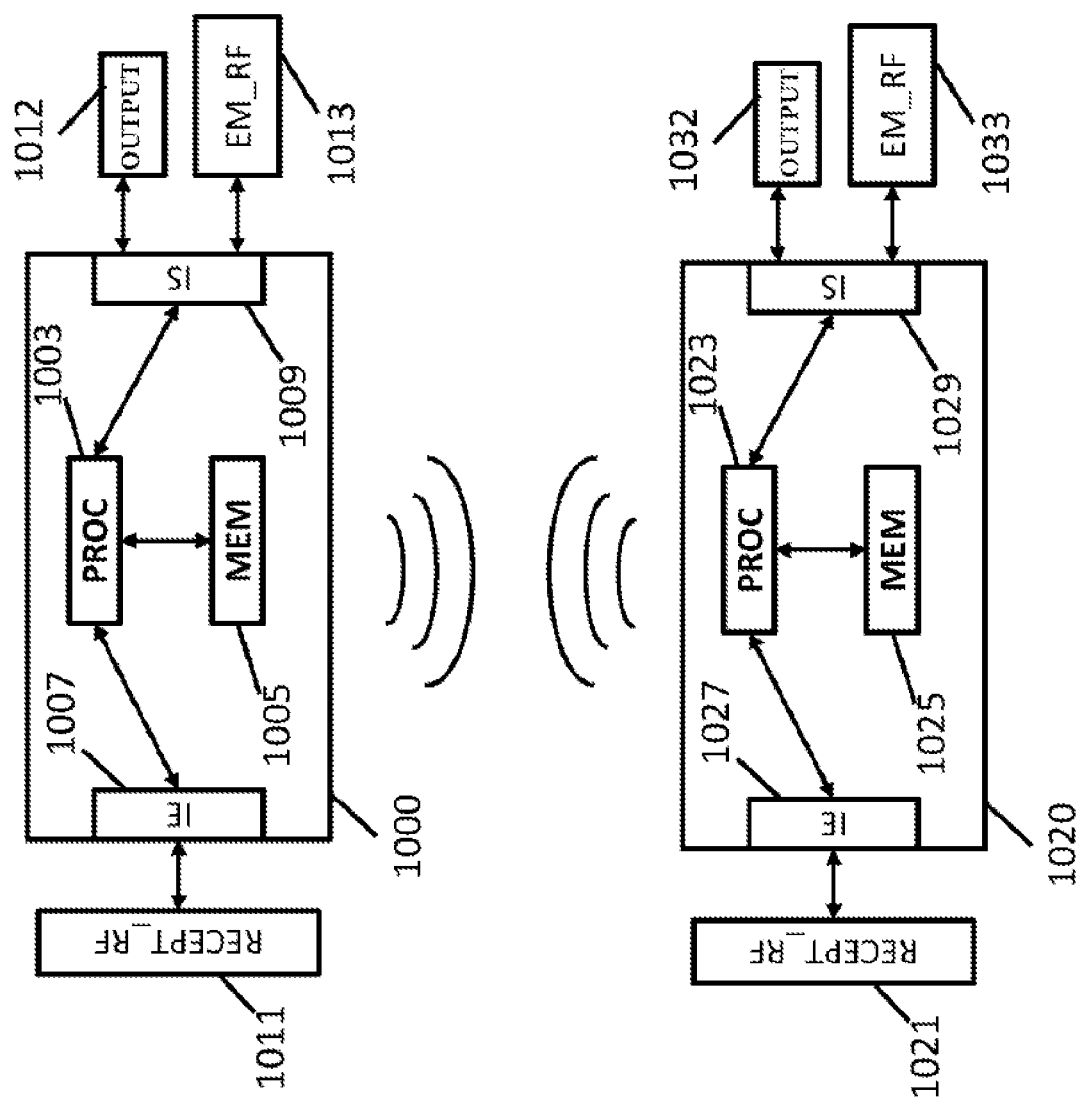
FIG. 10 illustrates a schematic representation of an audio speaker system in accordance with specific embodiments disclosed herein.

FIG. 10 illustrates a schematic representation of an audio speaker system that enables the present disclosure.

In this embodiment, each device 1000; 1020 (e.g., corresponding to the first wireless speaker and/or the second wireless speaker) may comprise respectively a memory 1005; 1025 to store program instructions loadable into a circuit and adapted to cause circuit 1003; 1023 to carry out the method of the present disclosure when the program instructions are run by respective circuits 1003; 1023 of each device 1000; 1020.

The respective memories 1005; 1025 of each device may also store data and useful information for carrying the method of the present disclosure as described above.

The circuit 1003 (or the circuit 1023) may be for instance:
a processor or a processing unit adapted to interpret instructions in a computer language, the processor or the processing unit may comprise, may be associated with or be attached to a memory comprising the instructions, or the association of a processor/processing unit and a memory, the processor or the processing unit adapted to interpret instructions in a computer language, the memory comprising said instructions, or an electronic card wherein the method of the present disclosure may be described within silicon, or a programmable electronic chip such as an FPGA chip (for «Field-Programmable Gate Array»).

Each device (e.g., wireless speakers or earpieces) may perform alternatively the method of the present disclosure, for instance, according to the respective level of a battery of each device. For instance, a device with the highest level of battery may be preferred to perform the method of the present disclosure.

Thus, each device 1000; 1020 of the audio speaker system (or wireless audio speaker system) may comprise respective input interfaces 1007; 1027 for the reception of input data (e.g., from a third device such as smartphone, television, connected speakers, etc.) via respective radiofrequency receivers 1011; 1021 (e.g., using the Bluetooth protocol). Each device 1000; 1020 may also comprise respective output interfaces 1009; 1029 for forwarding an encoded bitstream via respective radiofrequency transmitters 1013; 1033 and for emitting an analogue audio signal via respective outputs 1012; 1032.

Moreover, the respective input and output interface may allow each device to communicate by radiofrequency with each other (or with one or several third devices).

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the present disclosure.

What is claimed is:

1. An audio system comprising:
a first device with a first processor; and
a second device;
wherein the first device is configured to transmit data to the second device over a wireless link; and
wherein the first processor is configured to:
receive an encoded audio bitstream comprising a first and a second audio channels;
separate a first set of spectral components of the first audio channel and a second set of spectral components of the second audio channel from the encoded audio bitstream, without decoding the audio bitstream;
generate a first encoded bitstream from the first set of spectral components; and
forward the first encoded bitstream to the second device over the wireless link.

2. The system according to claim 1, wherein the separating of the first and second sets of spectral components comprises unpacking the encoded audio bitstream.

3. The system according to claim 2, wherein the first channel and the second channel are joint encoded, and wherein the separating of the first and second sets of spectral components further comprises an inverse quantization of the unpacked audio bitstream.

4. The system according to claim 3 wherein the generating of the first encoded bitstream is further based on a quantization of the first set of spectral components.

5. The system according to claim 1, wherein the second device further comprises a second processor configured to:
buffer, in a memory of the second device, a first digital audio signal, obtained from a decoding of the first encoded bitstream forwarded by the first device;
and wherein the first processor is further configured to:
buffer, in a memory of the first device, a second digital audio signal, obtained from a synthesis of the second set of spectral components.

6. The system according to claim 1, wherein the first processor is further configured to:
generate a second encoded bitstream based on the second set of spectral components;
buffer, in a first memory of the first device, the second encoded bitstream;
and wherein the second device further comprises a second processor configured to:
buffer, in a second memory of the second device, the first encoded bitstream.

7. The system according to claim 6, wherein the generating of the second encoded bitstream is further based on a quantization of the second set of spectral components.

8. The system according to claim 5, wherein the first processor and the second processor are further configured to:
perform a synchronization between respective outputs of buffering of each device.

9. The system according to claim 7, wherein the first processor and the second processor are further configured to:
perform a synchronization between respective outputs of buffering of each device.

10. The system according to claim 1, wherein at least the first and second devices are true wireless earbuds.

11. A method for forwarding an audio bitstream in a system, the method comprising:
receiving an encoded audio bitstream at a first device of the system comprising a first and a second audio channels;
separating a first set of spectral components of the first audio channel and a second set of spectral components of the second audio channel from the encoded audio bitstream, without decoding the audio bitstream;
generating a first encoded bitstream from the first set of spectral components; and
forwarding the first encoded bitstream to a second device of the audio rendering system over a wireless link.

12. The method according to claim 11, wherein the separating of the first and second sets of spectral components comprises unpacking the encoded audio bitstream.

13. The method according to claim 12, wherein the first channel and the second channel are joint encoded, and wherein the separating of the first and second sets of spectral components further comprises an inverse quantization of the unpacked audio bitstream.

14. The method according to claim 13, wherein the generating of the first encoded bitstream is further based on a quantization of the first set of spectral components.

15. The method according to claim 11, wherein the method further comprises:
buffering a first digital audio signal obtained from a decoding of the first encoded bitstream forwarded by the first device, and
buffering a second digital audio signal obtained from a synthesis of the second set of spectral components.

16. The method according to claim 11, wherein the method further comprises:
generating a second encoded bitstream based on the second set of spectral components;
buffering the second encoded bitstream; and
buffering the first encoded bitstream.

17. The method according to claim 16, wherein the generating of the second encoded bitstream is further based on a quantization of the second set of spectral components.

18. The method according to claim 14, wherein the method further comprises:
- performing a synchronization between respective outputs of buffering of each speaker.

19. A non-transitory computer readable storage medium, having stored thereon instructions that, when executed by a data-processing unit cause the data-processing unit to carry out the steps of a method, the method comprising:
- receiving an encoded audio bitstream at a first device of a system comprising a first and a second audio channels;
- separating a first set of spectral components of the first audio channel and a second set of spectral components of the second audio channel from the encoded audio bitstream, without decoding the audio bitstream;
- generating a first encoded bitstream from the first set of spectral components; and
- forwarding the first encoded bitstream to a second device of the audio rendering system over a wireless link.

\* \* \* \* \*